United States Patent
Inao et al.

(10) Patent No.: US 9,972,418 B2
(45) Date of Patent: May 15, 2018

(54) EXTERIOR MEMBER AND ELECTRIC WIRE ARRANGEMENT STRUCTURE

(71) Applicant: YAZAKI CORPORATION, Tokyo (JP)

(72) Inventors: Shinichi Inao, Makinohara (JP); Hideomi Adachi, Makinohara (JP); Takeshi Ogue, Makinohara (JP); Tatsuya Oga, Makinohara (JP); Masaaki Suguro, Makinohara (JP); Yoshiaki Ozaki, Makinohara (JP); Hiroyuki Yoshida, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 297 days.

(21) Appl. No.: 14/634,989

(22) Filed: Mar. 2, 2015

(65) Prior Publication Data
US 2015/0179308 A1    Jun. 25, 2015

Related U.S. Application Data

(63) Continuation of application No. PCT/JP2013/073430, filed on Aug. 30, 2013.

(30) Foreign Application Priority Data

Sep. 3, 2012    (JP) .................................. 2012-192883

(51) Int. Cl.
*H01B 7/36*    (2006.01)
*B60R 16/02*    (2006.01)
*H02G 3/02*    (2006.01)

(52) U.S. Cl.
CPC .......... *H01B 7/365* (2013.01); *B60R 16/0207* (2013.01); *B60R 16/0215* (2013.01); *H01B 7/366* (2013.01); *H02G 3/02* (2013.01)

(58) Field of Classification Search
USPC ............................. 307/104; 174/110 R, 111
See application file for complete search history.

(56) References Cited

U.S. PATENT DOCUMENTS

| 3,303,252 A | 2/1967 | Rogers |
| 5,350,885 A | 9/1994 | Falciglia et al. |
| 5,911,450 A | 6/1999 | Shibata et al. |

(Continued)

FOREIGN PATENT DOCUMENTS

| EP | 0787626 A2 | 8/1997 |
| EP | 0829884 A1 | 3/1998 |

(Continued)

OTHER PUBLICATIONS

Office Action dated Jun. 27, 2016, issued by the State Intellectual Property Office of P.R. China in counterpart Chinese Application No. 201380045908.8.

(Continued)

*Primary Examiner* — An Luu
(74) *Attorney, Agent, or Firm* — Sughrue Mion, PLLC

(57) ABSTRACT

An exterior member has an exterior member body having a base color, and an identification mark having an identification color different from the base color. The identification mark includes at least one of a plurality of line marks provided parallel to each other, and a line mark provided continuously and spirally.

6 Claims, 3 Drawing Sheets

(56) References Cited

U.S. PATENT DOCUMENTS 6,437,248 B1* 8/2002 Giebel ................ G02B 6/4482
174/110 R
2013/0248246 A1 9/2013 Oga

FOREIGN PATENT DOCUMENTS

| GB | 387789 | | 2/1933 |
|---|---|---|---|
| JP | 07-254313 | A | 10/1995 |
| JP | 2003-168329 | A | 6/2003 |
| JP | 2009-143326 | A | 7/2009 |
| JP | 2009-303467 | A | 12/2009 |
| JP | 2012-125097 | A | 6/2012 |

OTHER PUBLICATIONS

Communication dated Jul. 26, 2016, issued by the Japanese Patent Office in counterpart Japanese Patent Application No. 2012-192883.
Office Action dated Feb. 1, 2017 issued by the European Patent Office in counterpart European Patent Application No. 13833481.8.
Office Action dated Feb. 3, 2017, by the State Intellectual Property Office of P.R. China in counterpart Chinese Application No. 201380045908.8.
Written Opinion dated Oct. 22, 2013, issued by the International Searching Authority in counterpart International Application No. PCT/JP2013/073430.
International Search Report for PCT/JP2013/073430 dated Oct. 22, 2013 [PCT/ISA/210].
Communication from the European Patent Office dated Apr. 11, 2016 in a counterpart European Application No. 13833481.8.
Communication dated May 2, 2017, issued by the State Intellectual Property Office in the People's Republic of China in counterpart Chinese Patent Application No. 201380045908.8.
Communication dated Jan. 24, 2018, issued by the State Intellectual Property Office in the People's Republic of China in counterpart Chinese Patent Application No. 201380045908.8.
Communication dated Jul. 31, 2017, issued by the European Patent Office in counterpart European Application No. 13833481.8.

* cited by examiner

EXTERIOR MEMBER AND ELECTRIC WIRE ARRANGEMENT STRUCTURE

CROSS REFERENCE TO RELATED APPLICATIONS

This application is a continuation of International Patent Application No. PCT/JP2013/073430 filed on Aug. 30, 2013, claiming priority from Japanese Patent Application No. 2012-192883 filed on Sep. 3, 2012, the contents of which are incorporated herein by reference.

FIELD OF INVENTION

The present invention relates to an exterior member and an electric wire arrangement structure, and particularly relates to an exterior member disposed along an electric wire arranged between electric components to cover an outer periphery of the electric wire, and an electric wire arrangement structure including the exterior member.

BACKGROUND ART

In automobiles, various electric components and electronic devices are mounted, and electric wires (in other words, wire harnesses) are arranged between the electric components (electronic devices) to transmit electric power, control signals, and the like. For such various electric wires, there has been proposed to give, for each electric circuit, an identification mark to distinguish a corresponding electric wire (see Patent Document 1). According to a covered electric wire disclosed in Patent Document 1, a plurality of kinds of identification marks, different in color and size from one another, are printed intermittently along an axial direction (i.e., longitudinal direction) on an external surface of a covering portion.

Among the automobiles, especially in electric cars or hybrid cars, devices such as a motor, a battery, an inverter, and the like are electrically connected with one another through electric wires serving as power lines. By the electric wires, DC power from the battery is transmitted to the inverter, AC power obtained by inversion in the inverter is supplied to the motor, and the motor is driven by the supplied power. In this manner, the power supplied to the motor has a high voltage, and order to distinguish a high voltage electric wire, an insulation coating (i.e., sheath) of the electric wire or an exterior member (such as a corrugated tube or an aluminum pipe) may be entirely colored in an identification color (e.g., in orange) (see Patent Document 2).

In an electric car or a hybrid car, a battery may be placed below a seat or in a trunk room at a rear part of the vehicle while an inverter and a motor are placed in an engine room at a front part of the vehicle. In this case, an electric wire (i.e., the power line) connecting the battery and the inverter to each other may be arranged beneath a floor of the vehicle (see Patent Document 3). The electric wire arranged beneath the floor is typically covered by an exterior member to protect the electric wire from stones or water splashing during running of the vehicle. In addition, the electric wire may be also covered by an electrically conductive exterior member for shielding so as to prevent electric noise from leaking out from the electric wire to be arranged and prevent external electric noise from being mixed into the electric wire. In this manner, the exterior member is requested to have various functions, such as protecting and waterproofing the electric wire as well as electrically shielding the electric wire, and also requested to have various performances such as keeping the three-dimensionally arranged configuration, improving stability during transportation of the electric wire handling during mounting on a vehicle, and the like.

Patent Document 1: JP 2003-168329 A
Patent Document 2: JP 2009-143326 A
Patent Document 3: JP 2012-125097 A In an exterior member thus requested to have various performances, a suitable material and a suitable production method are selected. As a result, the following problems arise in distinguishing from other electric wires (or another exterior member) based on its identification color. First, when giving a plurality of kinds of identification marks, different in color and size from one another, intermittently along the longitudinal direction of an elongated exterior member as disclosed in Patent Document 1, a process of coloring the plurality of colors may be complicated and a coloring apparatus may increase in size. Thus, the manufacturing cost may increase. Next, when integrally molding a resin exterior member from a resin material mixed with a coloring agent as disclosed in Patent Document 2, a manufacturing process can be simplified. However, the process cannot be applied to a metal exterior member made of metal, and it is necessary to change the manufacturing process in accordance with the material of the exterior member, which is inefficient. In addition, when coloring an entire external surface of the metal exterior member, plenty of a coloring agent has to be used. Thus, there is another problem that the material cost increases.

SUMMARY OF INVENTION

It is therefore an object of the present invention to provide an exterior member and an electric wire arrangement structure, having a highly distinguishable identification mark while suppressing manufacturing cost for exterior members made of various kinds of material.

In order to solve the foregoing problems, an exterior member and an electric wire arrangement structure according to the present invention have the following features (1) to (4).

(1) An exterior member for covering, along an electric wire arranged between electric components, an outer peripheral surface of the electric wire, the exterior member including an exterior member body configured to have an elongated tubular shape and having a base color, and an identification mark provided on an external surface of the exterior member body and having an identification color different from the base color, the identification mark including at least one of a plurality of line marks provided continuously along a longitudinal direction of the exterior member body and parallel to each other and at least one line mark provided continuously and spirally along the longitudinal direction of the exterior member body.

Here, the plurality of line marks (e.g., stripe line marks or vertical stripe line marks) provided continuously along the longitudinal direction of the exterior member body and parallel to each other may be provided at at least two locations along the circumferential direction of the exterior member body. When the line marks are provided diametrically opposite locations on the exterior member body, one of the line marks can be visually recognized from any position in the circumferential direction. The at least one line mark provided continuously and spirally along the longitudinal direction of the exterior member body (i.e., a spiral line mark) may be a single spiral of a single continuous line mark or double (or triple or more) spirals of two or more continuous line marks provided without intersection with each other. In the case of a single spiral line mark, the spiral line mark making a round of the exterior member body is adjacent to the same line mark. In the case of double (or triple or more) spiral marks, one of the spiral line marks is adjacent to the other line mark. Such a spiral line mark is drawn regularly in the longitudinal direction and in the circumferential direction of the exterior member body. It is therefore possible to visually recognize the line marks from any position in the circumferential direction.

(2) In the exterior member according to (1) described above, each line mark has a line width, the line marks that are next to each other are provided so as to be separated at a given interval, and a ratio of the interval to the line width is twice or more.

(3) In the exterior member according to (1) or (2) described above, the identification mark includes an auxiliary mark provided along one side or each side of the line mark in a width direction of the line mark and colored in another identification color different from the identification color of the line mark.

(4) An electric wire arrangement structure including an electric wire arranged in a front-rear direction of a vehicle and below a floor of the vehicle, and the exterior member according to any one of (1) to (3) described above, covering the outer periphery of the electric wire.

According to the exterior member of (1) described above, an identification mark in an identification color different from the base color of the exterior member body is provided so that the identification mark can be given by coloring (e.g., coloring by painting or taping) the external surface of the exterior member body independently of the material of the exterior member body. In addition, the identification mark has a configuration including at least one of stripe line marks extending in the longitudinal direction of the exterior member body and a spiral line mark extending in the longitudinal direction of the exterior member body, so that the line mark can be visually recognized from any position in the circumferential direction of the exterior member body. Since visibility is ensured in this manner, the distinguishability of the exterior member can be enhanced by the identification color of the identification mark. In addition, in the case of the stripe line marks, coloring can be performed by moving the coloring means relatively in the longitudinal direction of the exterior member body. In the case of the spiral line mark, coloring can be performed by moving the coloring means relatively in the longitudinal direction and in the circumferential direction of the exterior member body. Thus, the identification mark can be provided by use of a comparatively simple manufacturing apparatus, and the manufacturing cost can be suppressed.

According to the exterior member of (2) described above, the ratio of the interval to the line width of the line mark is twice or more. That is, on the external surface of the exterior member body, the area of portions left in the base color is set to be larger than the area of portions colored with the line mark. Thus, the usage of the coloring agent (such as a paint or a color tape) can be reduced so that the material cost can be suppressed. The minimum value of the ratio of the interval to the line width of the line mark is twice, in which the width of the line mark is equal to the width of the base color. When the ratio is larger than twice, for example, three, five, seven, ten times or more, the usage of the coloring agent can be further reduced. It is preferable that the ratio of the interval to the line width of the line mark is about ten times or less to ensure visibility.

According to the exterior member of (3) described above, the auxiliary mark is provided on one side or each side of the line mark in the width direction of the line mark. When each auxiliary mark is colored in another identification color different from the identification color of the line mark, the visibility of the line mark can be further enhanced. Here, when a complementary color to the identification color of the line mark is used as the identification color of the auxiliary mark, the contrast can be enhanced to recognize the line mark visibly as if it were floating. Specifically, when the line mark is orange, the auxiliary mark is colored in a complementary color to the orange, such as blue, bluish purple or blue green, so that the visibility of the line mark floating from the auxiliary mark can be enhanced.

According to the electric wire arrangement structure of (4) described above, an exterior member provided with an identification mark including stripe line marks or a spiral line mark with high visibility as described above is used, and an electric wire covered with the exterior member is arranged below a floor of a vehicle, so that the distinguishability of the electric wire can be improved during maintenance of the vehicle. In addition, for example, assume that a high voltage electric wire for connecting a battery placed at a rear part of the vehicle with an inverter placed at a front part of the vehicle is covered with the exterior member in an electric car or a hybrid car. In this case, even when the exterior member is three-dimensionally bent in accordance with the shape of the underfloor of the vehicle, the line mark or one of the line marks can be recognized visibly from any position in the circumferential direction. Thus, the distinguishability can be prevented from being deteriorated.

EMBODIMENTS OF INVENTION

Figure 1:
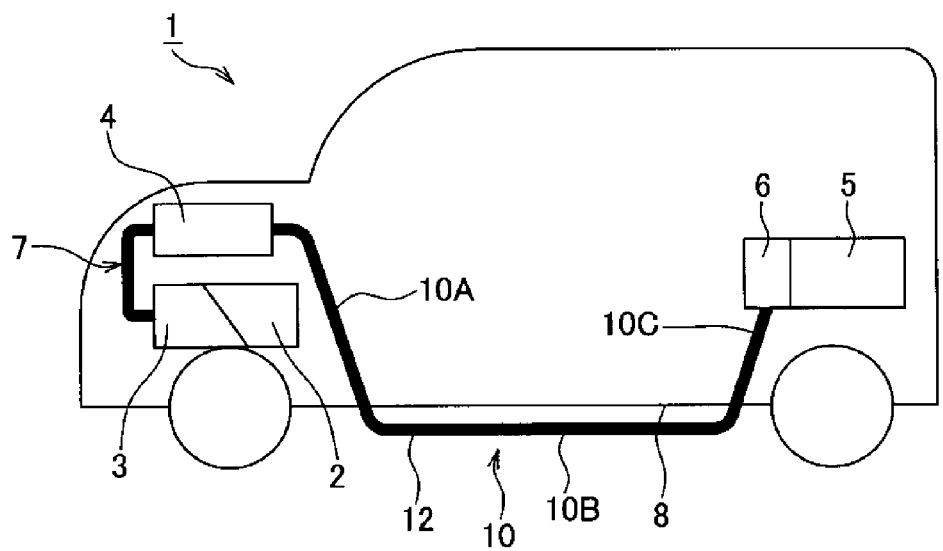
FIG. 1 is a diagram illustrating an automobile using an electric wire arrangement structure according to an embodiment.

An electric wire arrangement structure and an exterior member 20 used in the electric wire arrangement structure according to an embodiment of the invention will be described with reference to FIG. 1 to FIG. 4C. In the embodiment, particularly a hybrid car driven by driving power of both an engine and an electric motor is illustrated as a car (that is, a vehicle) 1 by way of example. An electric wire arrangement structure 10 provided in the automobile 1 will be described. The automobile 1 is not limited to the hybrid car, but may be an electric car driven by driving power of an electric motor.

The automobile 1 includes an engine 2 and an electric motor 3 mounted in an engine room at a front part of the vehicle, an inverter 4 provided near the electric motor 3, a battery 5 mounted in a trunk room or under a seat at a rear part of the vehicle, and a junction block 6 electrically connected to the battery 5. The electric wire arrangement structure 10 is to electrically connect the junction block 6 with the inverter 4 so that high-voltage DC power from the battery 5 can be supplied to the inverter 4 through an electric wire 11 (see FIG. 3). That is, in the embodiment, the junction block 6 and the inverter 4 are illustrated as electric components which are electrically connected through the electric wire 11. In addition, the electric motor 3 and the inverter 4 are electrically connected through a wire harness 7 so that electric power converted into a three-phase alternating current by the inverter 4 can be supplied to the electric motor 3.

Figure 2:
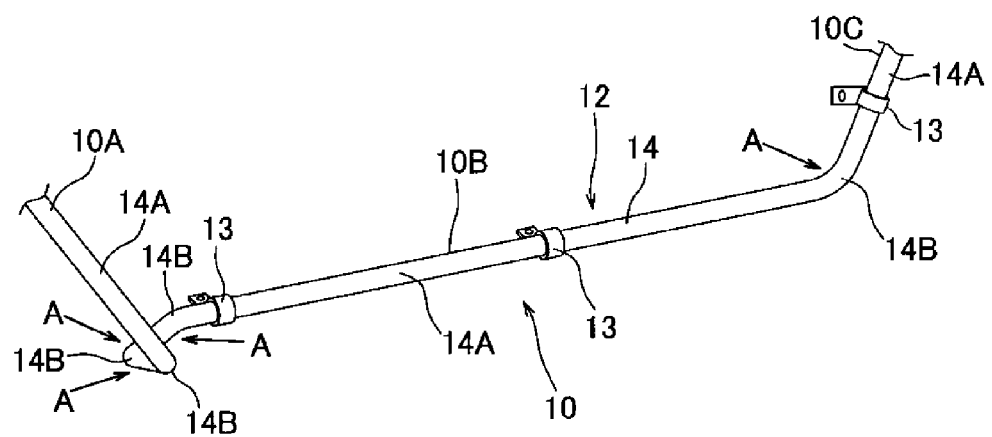
FIG. 2 is a perspective view illustrating an exterior member of the electric wire arrangement structure.
Figure 3:
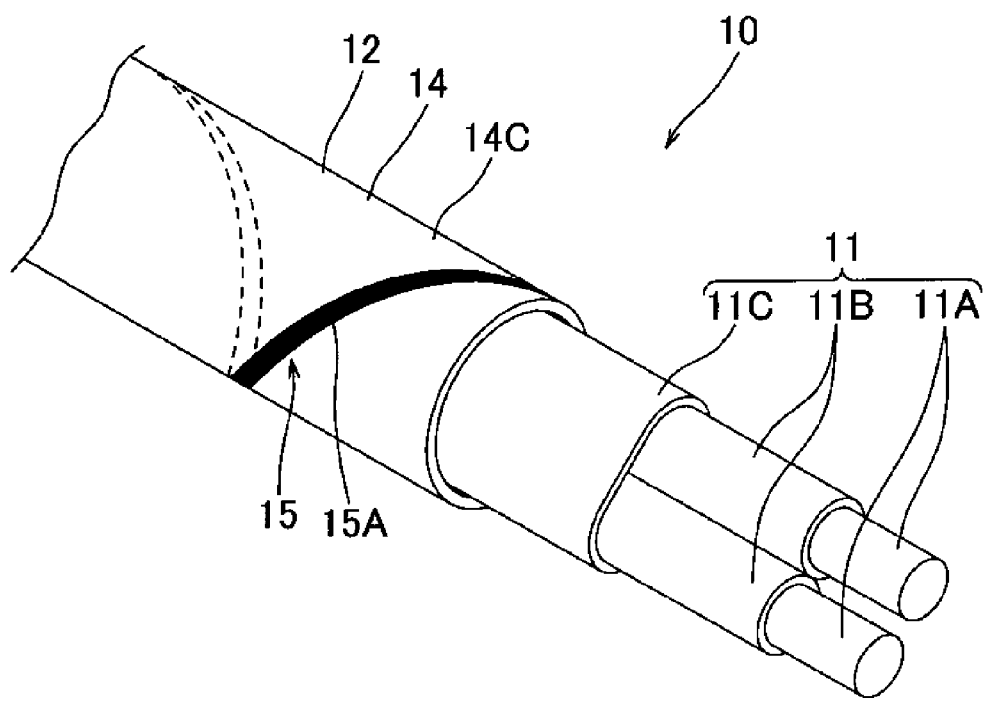
FIG. 3 is a partially-sectional perspective view illustrating the electric wire arrangement structure.

The electric wire arrangement structure 10 has a front portion 10A which is electrically connected to the inverter 4 inside the engine room at the front part of the vehicle, an intermediate portion 10B which is led out from the engine room to the lower side of a floor 8 and extends in the front-rear direction of the vehicle, and a rear portion 10C which is introduced into the trunk room on the floor 8 on the rear side of the vehicle and electrically connected to the junction block 6. As shown in FIG. 3, the electric wire arrangement structure 10 has an electric wire 11 which includes two core wires 11A, insulating coatings 11B and a sheath 11C, an exterior member 12 which extends along the electric wire 11 so as to cover the outer periphery of the electric wire 11, and a plurality of brackets 13 (see FIG. 2) which fix the exterior member 12 to the floor 8 of the vehicle or the like.

The electric wire 11 is a shield wire for transmitting a high voltage current. The electric wire 11 includes a not-shown shield material such as a braid. A front end portion and a rear end portion of the electric wire 11 are electrically connected to the junction block 6 and the inverter 4 through not-shown shield connectors respectively. The electric wire 11 is not limited to the shield wire, but a normal wire having no shield material may be used when the exterior member 12 has a shield function.

The exterior member 12 has an exterior member body 14 which is formed to be long and integral, out of a pipe made of metal such as an aluminum alloy, a pipe made of heat-resistant hard resin, or the like. As shown in FIG. 2, the exterior member 12 is bent at a plurality of intermediate positions (at positions A in FIG. 2) along its longitudinal direction. That is, the exterior member 12 is bent into a three-dimensional shape in accordance with the shape of the floor 8 and a wiring path so that the intermediate portion 10B of the electric wire arrangement structure 10 can be provided along the lower side of the floor 8 of the vehicle. Further, the exterior member 12 is bent upward from the intermediate portion 10B of the electric wire arrangement structure 10 toward the front portion 10A and the rear portion 10C respectively. In this manner, the exterior member body 14 is formed to have a plurality of straight portions 14A and bent portions 14B connecting the straight portions 14A with each other.

Figure 4A:
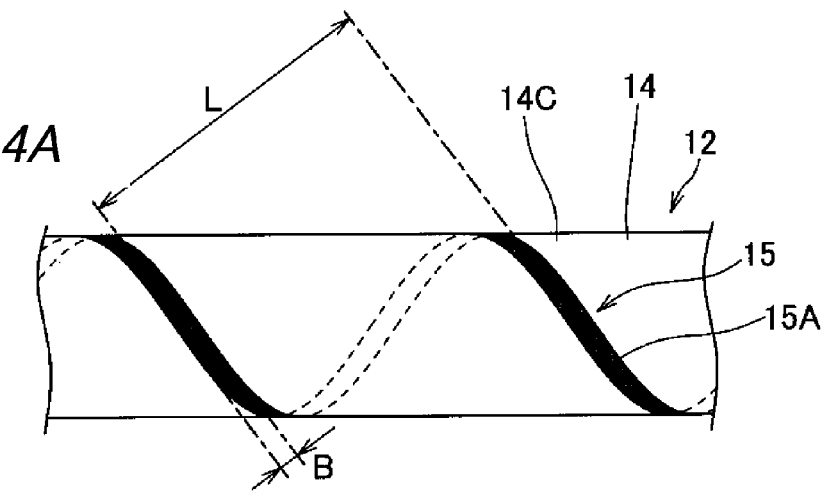
FIG. 4A to FIG. 4C are side views showing exterior members.
Figure 4B:
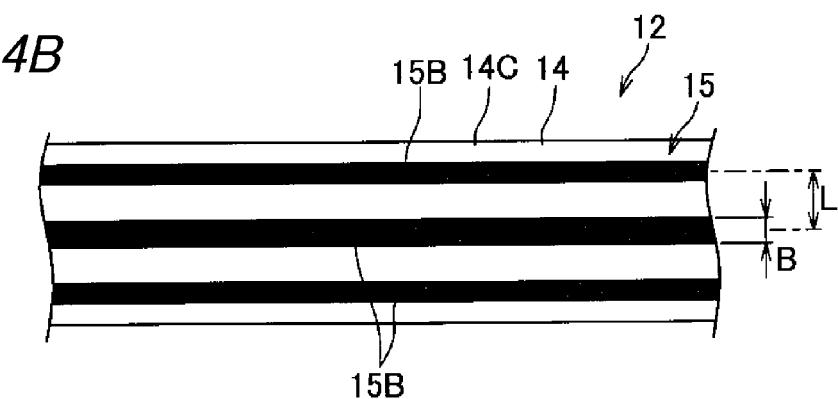

The exterior member 12 has an identification mark 15 provided in an external surface 14C of the exterior member body 14. The identification mark 15 has an identification color different from the base color of the exterior member body 14. The identification mark 15 has a line mark 15A (i.e., a spiral line mark) provided continuously in a spiral pattern (i.e., spirally) inclined with respect to the longitudinal direction of the exterior member body 14 as shown in FIG. 4A. Alternatively, the identification mark 15 has a plurality of line marks 15B (i.e., stripe line marks) provided continuously along the longitudinal direction of the exterior member body 14 and parallel to each other (i.e., in stripes) as shown in FIG. 4B. The line marks 15A, 15B are colored in orange as an identification color indicating the fact that the electric wire 11 has a high voltage. The identification color is not limited to the orange color but any color may be used as long as it is a color which is visible and different from the base color of the exterior member body 14.

Figure 4C:
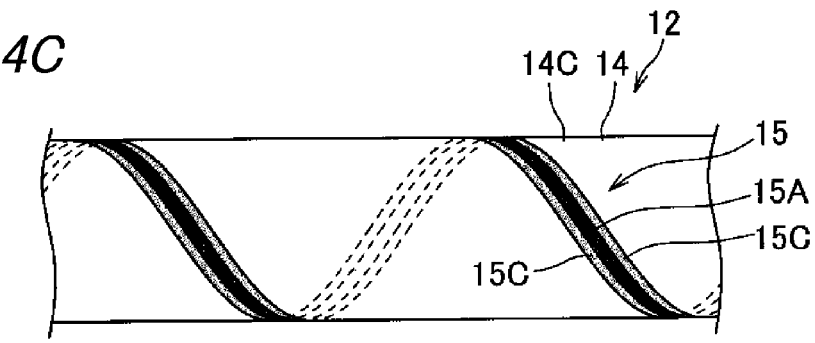

Further, as shown in FIG. 4C, the identification mark 15 may have auxiliary marks 15C provided on the width-direction opposite sides of the line mark 15A and colored in another identification color different from the identification color of the line mark 15A. It is preferable that the identification color of the auxiliary marks 15C is a color which is different from the base color of the exterior member body 14 and complementary to the identification color of the line mark 15A, 15B. For example, when the line mark 15A, 15B are colored in an orange color, it is preferable that the identification color of the auxiliary marks 15C is blue, bluish purple or blue green. The auxiliary marks 15C are not limited to ones provided on the opposite sides of the line mark 15A. An auxiliary mark 15C may be provided on one side of the line mark 15A. Further, the auxiliary marks 15C are not limited to ones provided along the line mark 15A (that is, the spiral line mark). The auxiliary marks 15C may be provided on one side or both sides of the line marks 15B (that is, the stripe line marks).

In the identification mark 15, as shown in FIGS. 4A and 4B, the ratio of an interval L between the line marks 15A, 15B arranged next to each other to the line width B of the line mark 15A, 15B is twice or more. Here, in the spiral line mark shown in FIG. 4A, a single continuous line mark 15A making a round of the exterior member body 14 forms parts adjacent to each other, and the interval L between the parts is equivalent to the spiral pitch. The spiral line mark is not limited to a mark made of a single continuous line mark 15A, and may be made of double (or triple or more) spirals. In that case, different line marks 15A are arranged next to each other. Therefore, the interval L between the different line marks 15A may be set to be twice or more of the line width B. On the other hand, in the stripe line marks shown in FIG. 4B, the line width B of each line mark 15B and the interval L between adjacent ones of the line marks 15B are set by dimensions extending in the circumferential direction of the exterior member body 14 respectively.

When the ratio of the interval L to the line width B is twice or more (that is, satisfies the relation of $L/B \geq 2$) in this manner, of the external surface 14C of the exterior member body 14, the area of portions left in the base color of the exterior member body 14 becomes larger than the area of portions colored with the line mark 15A or the line marks 15B. Thus, the usage of the coloring agent (such as a paint or a color tape) can be reduced so that the material cost can be suppressed. The minimum value of the ratio of the interval L to the line width B of the line mark 15A, 15B is twice (that is the case where the relation of $L/B = 2$ is satisfied), in which the width of the line mark 15A, 15B is equal to the width of the base color. When the ratio is set to be larger than two, for example, set to be three, five, at least seven, or further at least ten, the usage of the coloring agent can be further reduced. It is preferable that the ratio of the interval to the line width of the line mark is about ten or less in order to secure visibility.

Examples of the method for coloring the identification mark 15 on the external surface 14C of the exterior member body 14 in the exterior member 12 configured thus include a method in which a paint with the identification color is applied to the external surface 14C, a method in which a color tape with the identification color is pasted to the external surface 14C, and so on. To add the identification mark 15 by painting, there is a method in which the exterior member body 14 is rotated in the circumferential direction while being fed out in the longitudinal direction, and at least one coating head is pressed onto the external surface 14C so as to apply a paint to thereby add the spiral line mark 15A. There is another method in which the exterior member body 14 is fed out in the longitudinal direction while a plurality of coating heads arranged at given intervals in the circumferential direction are pressed onto the external surface 14C so as to add the line marks 15B. The exterior member body 14 and the coating head or heads are moved relatively to each other in a suitable direction and at a suitable speed in this manner, so that the line mark 15A or the line marks 15B can be colored comparatively easily.

According to the embodiment described above, the identification mark 15 with the identification color different from the base color of the exterior member body 14 is provided in the exterior member 12, so that the identification mark 15 can be given by coloring the external surface 14C independently of the material of the exterior member body 14. In addition, the identification mark 15 has a configuration including one of the spiral line mark 15A and the stripe line marks 15B, so that the line mark 15 can be visually recognized from any position in the circumferential direction of the exterior member body 14. Therefore, the distinguishability of the exterior member 12 can be enhanced even when the exterior member 12 is bent into a three-dimensional shape. Further, when the auxiliary marks 15C with a different identification color from that of the line mark 15A are provided, the contrast of the line mark 15A can be enhanced to further enhance the visibility.

The aforementioned embodiment simply shows a representative mode of the invention. The invention is not limited to the embodiment. That is, various modifications may be carried out on the invention without departing from the gist of the invention.

For example, although the embodiment shows, by way of example, the case where the electric wire 11 for use in a high voltage power line in a hybrid car or an electric car is aimed at and the identification mark 15 for identifying the fact that the electric wire 11 has a high voltage is provided in the exterior member 12, the identification mark is not limited to the mark for identifying a high voltage electric wire. The identification mark may be used for identifying any information such as the application of the electric wire or the classification of the electric wire. In addition, although the identification mark 15 is provided in the exterior member 12 of the electric wire 11 arranged below the floor 8 of the vehicle in the aforementioned embodiment, the exterior member 12 is not limited to being arranged below the floor 8. A wire harness 7 arranged in the engine room may be covered with the exterior member 12 having the identification mark 15. The exterior member according to the invention is applicable to an electric wire arranged at any place. Further, the exterior member body is not limited to one which is formed out of a pipe made of metal or resin and bent as in the aforementioned embodiment, but the exterior member may consist of a tube having flexibility, such as a corrugated tube.

The exterior member and the electric wire arrangement structure according to the embodiment will be summarized below.

(1) The exterior member 12 according to the embodiment is an exterior member which extends along the electric wire 11 arranged between electric components (the inverter 4 and the junction block 6) so as to cover the outer periphery of the electric wire 11. The exterior member 12 includes the exterior member body 14 configured to have an elongated tubular shape and having a base color, and the identification mark 15 provided in the external surface 14C of the exterior member body 14 and having an identification color (such as an orange color) different from the base color. The identification mark 15 includes at least one of a plurality of line marks 15B (see FIG. 4B) provided continuously along the longitudinal direction of the exterior member body 14 and parallel to each other, and at least one line mark 15A (see FIG. 4A) provided continuously and spirally along the longitudinal direction of the exterior member body 14.

(2) In the exterior member 12 according to the embodiment, each line mark 15A, 15B has a line width B, and the line marks 15A, 15B that are next to each other are provided so as to be separated at a given interval L, and the ratio of the interval L to the line width B is twice or more.

(3) In the exterior member 12 according to the embodiment, the identification mark 15 includes an auxiliary mark 15C provided along one side or each side of the line mark 15A, 15B in the width direction and colored in another identification color different from the identification color of the line mark 15A, 15B.

(4) The electric wire arrangement structure 10 according to the embodiment includes the electric wire 11 arranged in the front-rear direction of the vehicle and below the floor 8 of the vehicle (automobile 1), and the exterior member 12 according to any one of (1) to (3) described above, covering the outer periphery of the electric wire 11.

What is claimed is:
1. An exterior member for covering, along an electric wire arranged between electric components, an outer peripheral surface of the electric wire, the exterior member comprising:
an exterior member body configured to have an elongated tubular shape and having a base color; and
an identification mark provided on an external surface of the exterior member body and having an identification color different from the base color,
wherein the identification mark comprises at least one of:
a plurality of line marks provided continuously along a longitudinal direction of the exterior member body and parallel to each other; and
at least one line mark provided continuously and spirally along the longitudinal direction of the exterior member body, and
wherein each line mark has a line width, the line marks that are next to each other are provided so as to be separated at a given interval, and a ratio of the interval to the line width is between two and ten.

2. The exterior member according to claim 1, wherein each line mark has a line width, the line marks that are next to each other are provided so as to be separated at a given interval, and a ratio of the interval to the line width is twice or more.

3. The exterior member according to claim 1, wherein the identification color of the auxiliary mark is a complementary color to the identification of the line mark.

4. The exterior member according to claim 1, wherein
the identification mark comprises an auxiliary mark provided along one side or each side of the line mark in a width direction of the line mark and colored in another identification color different from the identification color of the line mark.

5. An electric wire arrangement structure comprising an electric wire arranged in a front-rear direction of a vehicle and below a floor of the vehicle, and an exterior member covering an outer periphery of the electric wire, the exterior member comprising:
an exterior member body configured to have an elongated tubular shape and having a base color; and an identification mark provided on an external surface of the exterior member body and having an identification color different from the base color, wherein the identification mark comprises at least one of:

a plurality of line marks provided continuously along a longitudinal direction of the exterior member body and parallel to each other; and at least one line mark provided continuously and spirally along the longitudinal direction of the exterior member body, and wherein each line mark has a line width, the line marks that are next to each other are provided so as to be separated at a given interval, and a ratio of the interval to the line width is between two and ten.

6. The exterior member according to claim 5, wherein the identification color of the auxiliary mark is a complementary color to the identification color of the line mark.

* * * * *